United States Patent [19]
Purdy

[11] Patent Number: 4,886,698
[45] Date of Patent: Dec. 12, 1989

[54] MULTIPLE-LAYER POLYOLEFIN FILMS

[75] Inventor: John R. Purdy, Stockton-On-Tees, England

[73] Assignee: Imperial Chemical Industries PLC, London, United Kingdom

[21] Appl. No.: 349,933

[22] Filed: May 8, 1989

Related U.S. Application Data

[63] Continuation of Ser. No. 863,618, May 15, 1986, abandoned.

[30] Foreign Application Priority Data

May 24, 1985 [GB] United Kingdom ............... 8513247

[51] Int. Cl.$^4$ .............................................. B32B 27/32
[52] U.S. Cl. .................................. 428/213; 428/520; 428/910; 428/517; 156/244.16
[58] Field of Search ............... 428/520, 213, 910, 517; 156/244.16

[56] References Cited

U.S. PATENT DOCUMENTS

| | | | |
|---|---|---|---|
| 3,381,717 | 5/1968 | Tyrrel | 156/244.14 |
| 3,595,735 | 7/1971 | Tyrrel | 428/323 |
| 3,853,661 | 12/1974 | Sudo | 156/244 |
| 4,194,039 | 3/1980 | Mueller | 428/213 |
| 4,279,957 | 7/1981 | Hiraoka et al. | 428/212 |
| 4,333,968 | 6/1982 | Nahmias | 428/520 |
| 4,352,849 | 10/1982 | Mueller | 428/520 |
| 4,481,058 | 11/1984 | Park | 428/349 |
| 4,505,969 | 3/1985 | Weiner | 428/349 |
| 4,567,089 | 1/1986 | Hattori et al. | 428/213 |
| 4,599,276 | 7/1986 | Martini | 428/520 |
| 4,619,859 | 10/1986 | Yoshimura et al. | 428/213 |

FOREIGN PATENT DOCUMENTS 0008934  3/1980  European Pat. Off. .
1055803  1/1967  United Kingdom .

OTHER PUBLICATIONS

EPO Search Report, EP 86 30 3484, dated Feb. 22, 1988.
Derwent Abstract, German DE 3340504A, No. 113.
Derwent Abstract, French Patent 2409858, No. 120.

Primary Examiner—Edith Buffalow
Attorney, Agent, or Firm—Cushman, Darby and Cushman

[57] ABSTRACT

A multiple-layer polyolefin film comprises a primary layer of an adhesive resin, such as an ethylene-vinyl acetate copolymer, and two secondary layers of an oriented propylene polymer, the thickness of the primary layer being less than 10% of the total film thickness.

11 Claims, 2 Drawing Sheets

MULTIPLE-LAYER POLYOLEFIN FILMS

This is a continuation of application Ser. No. 863,618 filed May 15, 1985, which was abandoned upon the filing hereof.

BACKGROUND OF THE INVENTION

1. Technical Field of the Invention

This invention relates to a polyolefin film and, in particular, to a multiple-layer polyolefin film.

2. Background of the Art

Polyolefin films are widely employed as packaging wrappers for articles of commerce, and are eminently suitable for this purpose. However, for certain packaging applications in which, for example, the wrapped article may be subjected to impact or exposed to contact with relatively sharp or abrasive objects while in transit or during handling, it is desirable to provide a film wrapper exhibiting improved impact strength and puncture resistance. An apparent solution to the problem would be to increase the thickness of the film. However, the nature of the polymeric film-forming process is such that when a sufficiently thick cast extrudate is formed, the resultant film exhibits inherent profile defects and inferior optical characteristics. It has therefore been proposed to provide a thick polymeric film by forming a laminate of two, more, plies of relatively thin film. For example, U.S. Pat. No. 3,554,833 exemplifies a blown film technique wherein an extruded, single wall tubular film of molten polyethylene is inflated and subsequently flattened, while the interior surfaces of the tube are in a semi-molten condition, by passing the tube between a pair of rotating, pressure nip rolls, and then cooling the resultant laminate to a permanent set condition.

Attempts to prepare laminates of polymers or higher alpha monoolefins, containing 3 or more carbon atoms in the molecule, by collapsing a tubular film, have not been particularly successful. Defects encountered include poor interlaminar adhesion, entrapment of gas bubbles between the layers of the laminate, and poor optical characteristics.

We have now devised an improved multiple-layer polyolefin film.

SUMMARY OF THE INVENTION

Accordingly, the present invention provides a multiple-layer polyolefin film comprising a primary layer of an adhesive resin and, on each surface thereof, a secondary layer of an olefin polymer wherein
  (a) the adhesive resin comprises an ethylene copolymer having a softening temperature below that of the secondary olefin polymer,
  (b) the secondary layer comprises an oriented layer of a propylene polymer, and
  (c) the thickness of the primary layer is less than 10% of the total film thickness The invention also provides a method of producing a multiple-layer polyolefin film comprising forming a first secondary film layer of an olefin polymer having on a surface thereof a primary layer of an adhesive resin, and bonding the primary layer to a surface of a second, secondary film layer of an olefin polymer wherein,
  (a) the adhesive resin comprises an ethylene copolymer having a softening temperature below that of the secondary olefin polymer,
  (b) each secondary layer comprises an oriented layer of a propylene polymer, and
  (c) the thickness of the primary layer is less than 10% of the total film thickness.

DETAILED DESCRIPTION AND PREFERRED EMBODIMENTS OF THE INVENTION

Figure 1:
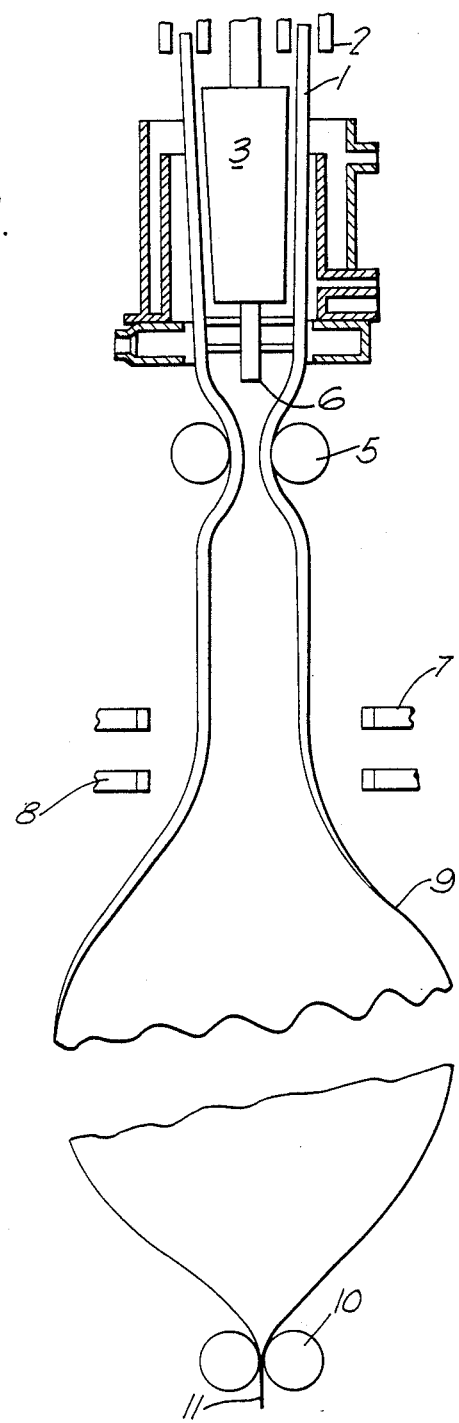

A multiple-layer film as hereinbefore defined is "self-supporting" in the sense that it is capable of an independent existence in the absence of a supporting substrate. Indeed, in a preferred embodiment of the invention the defined film itself serves as a substrate for at least one additional film-forming polymeric layer adhered to a surface of a secondary layer.

An ethylene copolymer resin suitable for use as the primary, adhesive layer should have a softening temperature below that of the propylene polymer of the secondary layers. Desirably, a substantial proportion of the adhesive ethylene copolymer should melt at a temperature below about 110° C., particularly in a range of from about 70° to 100° C., the melting temperature being defined as the peak of the melting endotherm observed in respect of a polymer sample in the reheating stage of a thermal cycle in which the sample has been heated from room temperature to 160° C., held at that temperature for 2 minutes, cooled to ambient temperature, and reheated, each of the heating, cooling and reheating stages in the cycle being effected at a rate of 20° C. per minute.

Provided the ethylene copolymer exhibits the required softening temperature the ethylene content thereof may vary over a wide range-depending, inter alia, on the nature of the comonomer(s) copolymerisable therewith. For example, if the comonomer is an unsaturated (alkenyl) ester of a carboxylic acid (2-10 carbon atoms), such as vinyl acetate or vinyl propionate, the ethylene content of the copolymer may be as high as 95% by weight, whereas if the comonomer comprises at least one other higher (3-10 carbon atoms) mono-olefin, such as propylene and/or butene-1, the ethylene content of the copolymer may be considerably less, particularly less than 10%, for example—from 2 to 8%, and in some cases even less than 1%—for example from about 0.25% to 0.75% by weight of the copolymer.

A suitable adhesive resin comprises an ethylene-vinyl acetate copolymer containing from 5 to 35% by weight of the copolymer of vinyl acetate. Preferably, the vinyl acetate content of the adhesive ethylene copolymer is from 10 to 30%, and particularly from 20 to 28%, by weight. As the vinyl acetate content of the copolymer is increased so too does the tendency of the resultant film to form peelable heat-seals.

Another suitable adhesive resin comprises an ethylene-propylene random copolymer containing from about 3 to 6% by weight of ethylene.

If desired, the adhesive resin layer may additionally comprise an efective amount, conveniently a minor amount (ie less than 50% by weight), of a compatible polymer—for example, an olefinic homo-, co-, or terpolymer. Thus, another suitable resin comprises a blend of a propylene-butene-1 copolymer (25-35 wt % butene-1) and from 5 to 20% by weight of the blend of a propylene-ethylene copolymer (2-6 wt % ethylene).

The propylene polymer component of each secondary layer is suitably a propylene homopolymer, or a propylene-olefin copolymer-particularly a propylene-olefin block copolymer. A suitable block copolymer comprises a propylene-ethylene block copolymer containing up to 15% especially from 4 to 8%, of ethylene by weight of the copolymer, although for packaging films it is preferred to employ a propylene homopolymer.

A three-layer film according to the invention, comprising a primary ethylene copolymer layer and two secondary propylene polymer layers, may serve as a substrate for one or more additional film-forming layer(s). For example a tertiary layer may be adhered to the outermost surface (remote from the primary layer) of one, or each, secondary layer. Such additional layers may be formed on a substrate film for a variety of reasons—for example, to improve one or more of the film gas-barrier, moisture-barrier, optical, and particularly heat-sealing characteristics. These additional layers are generally of a polymeric, particularly a polyolefinic, nature, such as a propylene-alpha olefin copolymer eg a propylene-ethylene or propylene-butene-1 copolymer, or a propylene-ethylene-butene-1 terpolymer, or blends thereof—optionally with olefin homopolymers. For example, to provide desired heat-sealing characteristics a tertiary layer may comprise a propylene-ethylene random copolymer containing up to 20%, preferably from 5 to 10%, of ethylene by weight of the random copolymer.

Formation of the various olefin homo- and co-polymers herein described as being suitable for use in the multiple-layer films of the invention is conveniently effected in the presence of an organo-metallic catalyst, such as a transition metal compound with an organo-metallic activator. Particularly useful compounds of this type are titanium halide compounds activated with aluminum alkyl compounds. A preferred material is a titanium chloride.

Polymerisation of the olefin monomers may be effected in known manner—for example, in the presence or absence of an inert diluent, suc as a suitably purified paraffinic hydrocarbon, in the liquid phase using an excess of liquid monomer as the polymerisation medium, or in the gas phase, the latter term being herein employed to indicate the essential absence of a liquid medium.

Formation of a multiple-layer film according to the invention is conveniently effected by any of the laminating or coating techniques conventionally employed in the production of composite films. Preferably, however, at least the primary and secondary layers, and desirably also any tertiary or further layer, are formed by a coextrusion technique in which the polymeric components of the respective layers are coextruded into intimate contact while each is still molten. Preferably, the coextrusion is effected from a multi-channel annular die so designed that the molten polymeric components constituting individual layers of the composite film merge at their boundaries within the die to form a single composite structure which is then extruded froma common die orifice in the form of a tubular extrudate having a primary layer of the adhesive ethylene copolymer on its internal surface. Subsequent collapsing of the resultant tubular film (after orientation) while the primary layer is in a thermally-softened state, under an appropriate pressure applied, for example, by passing the tubular film between a pair of pressure nip rolls, enables a thick film to be prepared, the collapsed film having an overall thickness of approximately twice the wall thickness of the tubular film.

A multiple-layer composite film according to the invention is stretched at a temperature above the glass transition temperature of the propylene polymer to effect molecular orientation of at least the secondary propylene polymer layer. Orientation of at least the propylene polymer layer is conveniently effected at a temperature within a range of from about 145° to 165° C. At such temperatures the primary adhesive layer will be in a molten condition, and molecular orientation thereof will not occur to any significant extent.

Orientation may be effected uniaxially, by stretching the film in one direction, or biaxially, by stretching the film in each of two mutually perpendicular directions in the plane of the film, and the biaxial orientation may be balanced or unbalanced, for example with the higher degree of orientation of an unbalanced film in a preferred direction—usually the transverse direction.

Biaxial orientation of a flat, multiple-layer film may be effected by simultaneous or sequential stretching in each of two mutually perpendicular directions by means of a stenter, or by a combination of draw rolls and a stenter. However, in a preferred tubular process at least the primary and secondary layer components are coextruded in the form of a composite tube, the primary adhesive component being disposed on the internal surface thereof. The coextruded tube is subsequently quenched, for example—by an internal mandrel and/or external coolant bath, reheated, expanded by internal gas pressure to induce transverse orientation, and withdrawn, at a rate greater than that at which it is extruded, to stretch and orient at least the secondary layer in the longitudinal direction. The oriented tube, reheated if necessary, at a temperature at which the primary layer component is in a thermally softened state, for example from about 80° to 110° C. for an ethylene-vinyl acetate copolymer, is then collapsed under appropriate external pressure whereby opposed regions of the adhesive component layer become bonded together to create a single homogeneous primary layer to which opposed secondary layers are firmly bonded.

The tubular coextrusion technique is particularly suitable for the production of a film comprising at least five layers. For example, collapse of an oriented tubular film derived from a three-layer tubular coextrudate comprising an internal primary adhesive layer, a propylene polymer secondary layer and an outer tertiary layer of, for example, a polymeric heat-sealable medium, yields a five-layer film comprising an internal homogeneous primary layer, two intermediate secondary layers and two outer tertiary layers.

The degree to which at least the secondary layer of the film is oriented depends to some extent on the ultimate use for which the film is intended, but satisfactory tensile and other properties are generally developed when the film is stretched to between three and ten, preferably, seven, times its original dimensions in each of the transverse and longitudinal directions.

After stretching, the polymeric film is normally "heat-set" while restrained against shrinkage or even maintained at constant dimensions, at a temperature above the glass transition temperature of the propylene polymer and below its melting point. The optimum heat-setting temperature can readily be established by simple experimentation, and is conveniently in a range of from about 100° C. to 170° C. Heat-setting may be effected by conventional techniques—for example by means of a stenter system, or by a system of one or more heated rollers as disclosed, for example, in British Pat.

No. 1 124 886. Alternatively, or additionally, the film may be subjected to a constrained heat treatment of the kind described in European patent 23776.

If desired, a surface of a secondary or tertiary layer of a film according to the invention may be subjected to a chemical or physical surface-modifying treatment, a preferred treatment, because of its simplicity and effectiveness, being to subject the film surface to a high voltage electrical stress accompanied by corona discharge. If the composite film is to serve as the substrate for a subsequently applied polymeric layer or layers, such surface-modifying treatment is particularly desirable to improve the adhesion between the substrate and the applied layer(s). Alternatively, or additionally, a film surface intended to receive a further coating layer may be treated with an intermediate primer or anchor coating medium of the kind conventionally employed in association with polyolefin films.

It is an object of the invention to produce a thick film by which is meant a film having a total thickness of at least 35 microns. Films having a total thickness in a range extending from 35 to 150 microns are of general utility, but for packaging applications a film having a total thickness of from 40 to 100 microns, and particularly from 50 to 75 microns, is preferred.

It is a feature of the invention that the adhesive primary layer is particularly thin, ie less than 10%, especially less than 6%, of the total film thickness. Preferably, the primary layer constitutes less than 5%, and particularly between 1 and 3%, of the total film thickness. Surprisingly, the use of such thin primary layers substantially overcomes problems associated with entrapment of gas bubbles between the opposed secondary layers, and the poor optical and inter-laminar adhesion characteristics hitherto encounted in attempts to prepare laminates of propylene polymer films.

One or more of the layers of the multiple-layer films of the invention may conveniently contain any of the additives conventionally employed in the manufacture of thermoplastic films. Thus, additives such as dyes, fillers, pigments, lubricants, anti-static agents, anti-oxidants, anti-blocking agents, surface-active agents, stiffening aids, slip aids, gloss-improvers, prodegradants, and ultra-violet light stabilisers may be employed, if desired, such of the aforementioned additives as may be required may be applied directly to a surface of the film, preferably prior to orientation—for example by a wash-coating technique. A filler, particularly a mineral filler—such as particulate calcium carbonate, capable of generating an opaque, voided film structure on orienting, or a pigment, such as titanium dioxide, is conveniently incorporated into the film, particularly into the primary core layer thereof.

Figure 2:
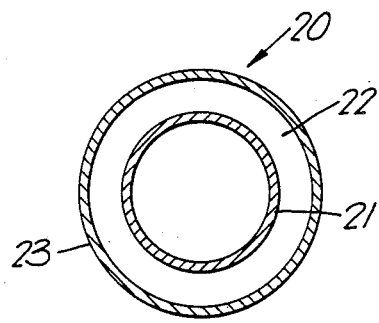
Figure 3:
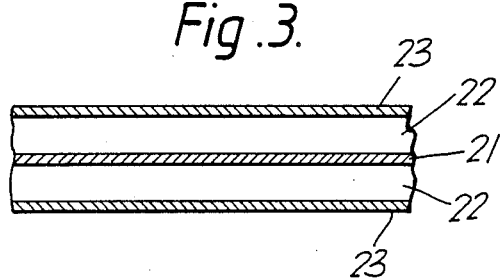
Figure 4:
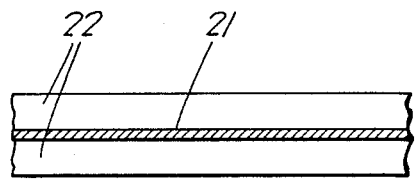

The invention is illustrated by reference to the accompanying drawings in which:

FIG. 1 is a schematic elevation, not to scale, depicting a tubular process for the production of a multiple-layer film, FIG. 2 is a schematic cross-sectional plan view of a quenched tubular extrudate produced at an intermediate stage in the process of FIG. 1, FIG. 3 is a schematic, fragmentary, elevation of a five-layer film, and FIG. 4 is a schematic, fragmentary, elevation of a three-layer film.

Referring to FIG. 1, a composite triple layer polymeric, tube 1 is coextruded from a triple channel annular die 2 and rapidly quenched by an assembly comprising an internal, lubricated, tapered mandrel 3 and external liquid coolant bath 4 of the kind described in British Pat. No. 1284321. The quenched tube is withdrawn from the mandrel by a pair of contra-rotating nip rolls 5 of width less than that of the partially collapsed tube whereby an inflating gas, such as air, introduced through pipe 6, may enter the tube which has been heated to orienting temperature by cylindrical infra-red heaters 7 and 8. Inflation of tube 1 to form a bubble 9 effects transverse orientation of the polymeric tube. Simultaneous longitudinal orientation is effected by a pair of nip rolls 10 which collapse, and form a gas-tight seal across, the inflated tube, and withdraw the collapsed tube at a rate greater than that at which the extruded tube is withdrawn from the mandrel by nip rolls 5.

By collapsing the inflated tube while the internal primary layer thereof is in a thermally softened condition, nip rolls 10 ensure that a single composite multiple-layer film 11 is produced.

As shown in FIG. 2, the quenched polymeric tubular extrudate 20, prior to orientation, comprises a thin, internal, primary layer 21, a relatively thick intermediate secondary layer 22 and an external, relatively thin tertiary layer 23.

The film of FIG. 3, derived from the tubular extrudate of FIG. 2, comprises a thin, primary layer 21, two relatively thick secondary layers 22, and two relatively thin tertiary layers 23.

The film of FIG. 4 comprises only three layers—a thin primary layer 21, and two relatively thick secondary layers 22.

The invention is further illustrated by reference to the following Examples.

Films made according to the Examples were assessed by standard test methods. The Heat seal strengths of the various films were assessed by the following procedure:

Two strips of a multiple-layer film having at least one heat-sealable surface layer are placed with the heat-sealable surfaces in contact with each other, and the ends of the strips sealed together between the jaws of a Sentinel Heat Sealer, Model No 12AS, only one jaw of the unit being heated. The strength of the seal is measured by cutting from the sealed-together strips of film, which have been allowed to cool to ambient temperature, a strip 25 mm wide and some 100 mm long, the heat seal extending across the entire width of the strip and having an area of some 25×25 mm. The unsealed ends of the strip are then attached respectively to a dynamometer and a gripping surface, a load is applied to the gripping surface, and the load required to separate the strips in the sealed area, at a rate of 30.5 cms per minute, is recorded by the dynamometer, and expressed as a seal strength of x g/25 mm, where x is the load in grammes.

EXAMPLE 1

This Example was performed using equipment of the kind depicted in FIG. 1 of the drawings.

From a triple channel annular die were coextruded a propylene homopolymer, a propylene-ethylene random copolymer containing about 6% by weight of ethylene, and an ethylene-vinyl acetate (E-VA) copolymer containing about 28% by weight of vinyl acetate (melting temperature ~70° C.; Vicat softening temperature <40° C.) so as to form a polypropylene tube the internal surface of which was coated with a primary layer of the ethylene-vinyl acetate copolymer and the external surface of which was coated with a tertiary layer of the propylene-ethylene (P/E) random copolymer.

The coated polypropylene tube was cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to seven times its original dimensions in both the direction of extrusion and in a direction transverse thereto.

The oriented tubular film was then collapsed to lay-flat form between the outlet nip rolls while the primary layer was in a thermally softened condition, whereby the opposed primary layers fused into a single homogeneous layer to yield a five-layer film. The five-layer film was then edge-trimmed and heat-set at a temperature of about 130° C. on a matt-surfaced roller heat-setter of the kind described in British Pat. No. 1 124 886.

Discharge treatment of the heat-set film was effected by a single aluminium rod electrode extending across the entire width of the film, and connected to a Sherman GT60, 6 kilowatts, solid state corona treater, operating at 3 amps.

The total thickness of the resultant five layer film was 50 microns and comprised a primary ethylene vinyl-acetate copolymer layer of 1.5 microns thickness, two secondary propylene homopolymer layers each of 24 microns thickness and two outer tertiary layers of the propylene-ethylene random copolymer each of about 0.25 micron thickness.

Samples of the film were assessed by various test methods, the results being recorded in the following table:

TABLE 1

| PROPERTY | TEST INFORMATION | UNITS | EXAMPLE 1 |
|---|---|---|---|
| Thickness | | Micron | 50 |
| Yield | | $m^2/Kg$ | 22.0 |
| Permeability to: | | | |
| Water Vapour | 23° C. 85% RH (DIN 53/22) | $g/m^2/24$ hr | 0.5 |
| | 38° C. 90% RH (ASTM E96) | $g/m^2/24$ hr | 3.8 |
| Oxygen | 25° C. 0% RH (ASTM D1434) | $cm^3/m^2/24$ hr | 1000 |
| Nitrogen | 25° C. 0% RH (ASTM D1434) | $cm^3/m^2/24$ hr | 210 |
| Carbon Dioxide | 25° C. 0% RH (ASTM D1434) | $cm^3/m^2/24$ hr | 2800 |
| Optics: | | | |
| Gloss | ASTM D2457 Gardner 45° | % | 75–85 |
| Haze (Wide Angle) | ASTM D1003 | % | 2–3 |
| Haze (Clarity) | ICI Test Gardner 2½° | % | 4–8 |
| Coefficient of | ASTM D1894 Static | | 0.3–0.4 |
| Friction | Dynamic | | 0.3–0.4 |
| Tensile Strength | ASTM D882 | MD $kgf/cm^2$ | 2000 |
| | Strain Rate 25%/min | TD $kgf/cm^2$ | 1500 |
| Elongation at | ASTM D882 | MD % | 85 |
| Break | Strain Rate 25%/min | TD % | 115 |
| Elasticity | ASTM D882 | MD $Kgf/cm^2$ | 19000–22000 |
| Modulus (1% | Strain Rate 5%/min | TD $Kgf/cm^2$ | 15000–19000 |
| Secant) | | | |
| Puncture | ICI Test 3 mm Probe | Newton | 70 |
| Resistance | | | |
| Sealing Range | Laboratory Heat Sealer | °C. | 120–145 |
| Seal Strength | ICI Test at 130° C. (1 $kgf/cm^2$ for 2 sec) | g/25 mm | >350 |
| Seal Failure | | | Peeling |
| Shrinkage | ICI Test 60 sec/120° C. | MD | 5 |
| | | TD % | 0 |
| | 60 sec/130° C. | MD | 7 |
| | | TD % | 0 |
| | 60 sec/140° C. | MD | 15 |
| | | TD % | 9 |
| Temperature Range for use | | °C. | −70 to +75 |
| Melting Point | | °C. | +170 |

EXAMPLE 2

The procedure of Example 1 was repeated save that the primary layer comprised an ethylene-vinyl acetate copolymer (melting temperature ~85° C.) containing about 18% by weight of vinyl acetate.

There was evidence of some entrapped air bubbles in the core layer of the resultant, oriented film structure. The observed seal strength was similar to that of Example 1, and, when opened, the mode of seal failure was a mixture of tearing and peeling.

EXAMPLES 3 TO 7

The procedure of Example 1 was repeated (primary layer of E-VA; 28 wt % VA) to yield films of 60 microns thickness in which the thickness of the primary E-VA layer in the respective films was varied as recorded in the accompanying Table:

TABLE 2

| Example | Primary Layer Thickness (μm) | % of total film | Heat Seal Strength* (g/25 mm) | Seal Opening ICI Test Manual | |
|---|---|---|---|---|---|
| 3 | 1.3 | 2.2 | 791 | Tear | Tear |
| 4 | 2.6 | 4.3 | 747 | Peel | Tear |
| 5 | 2.9 | 4.8 | 687 | Peel | Tear |
| 6 | 3.9 | 6.5 | 649 | Peel | Tear |
| 7 | 4.6 | 7.7 | 545 | Peel | Tear |

*Seals made on SENTINEL Heat Sealer (130° C., 15 psi, 2 seconds).

On the test equipment the seals were observed to tear at lower thicknesses of the primary layer and to peel apart at the higher thicknesses. When seals were pulled apart manually, all seals were observed to tear to a degree but the amount of peel failure increased (while the seal strength decreased) with increasing thickness of the primary layer.

EXAMPLE 8

The procedure of Example 1 was repeated save that the primary layer composition comprised a blend of (a) 87% by weight of a propylene-butene-1 copolymer containing about 30% by weight of butene-1 and (b) 13% by weight of a propylene-ethylene copolymer containing about 3% by weight of ethylene.

The temperature of the film bubble upstream of the outlet nip rolls was increased slightly, because of the higher Vicat softening temperature (about 85° C.) of the blend, to achieve effective lamination.

The resultant film (79 microns thick with primary layer 2 microns thick), tested as in Example 1, had the following characteristics:

| | |
|---|---|
| Seal Strength (130° C.) | 1050 g/25 mm |
| Haze (Wide Angle) | 3–4% |
| Haze (Clarity) | 5–6% |
| Gloss | 78–86% |

The seals opened by peeling when assessed by the standard test method.

EXAMPLE 9

A sample of the five-layer film of Example 1 was further coated as follows:

Using a roller coating asembly, each tertiary surface layer of the film was coated with a solution (6 weight % solids content) in industrial methylated spirits of an interpolymerised primer resin containing 38.5 parts of styrene, 44 parts of ethyl acrylate, 2.5 parts of methacrylic acid, and 15 parts of acrylamide condensed with 5.2 parts of formaldehyde in n-butanol.

The resultant film was immediately passed through a drying oven maintained at a temperature of about 85° C. The thickness of the dried rein coating was approximately 0.125 μm on each surface of the film.

Using a roller coating assembly each primed surface of the film was then coated with an aqueous dispersion containing 42 wt % of a heat-sealable vinylidene chloride-acrylonitrile copolymer (88:12 by weight).

The resultant web was dried in an oven at a temperature in a range of from about 120° to 130° C., and the thickness of the dried heat-sealable coating on each surface of the web was found to be approximately 1.80 μm.

The resultant film, tested as in Example 1, had the following characteristics:

| | |
|---|---|
| Seal strength (130° C.) | 480 g/25 mm |
| Haze (Wide Angle) | 2–3% |
| Haze (Clarity) | 6–8% |
| Gloss | 107% |
| Oxygen Permeability | 16 cm$^3$/m$^2$/24 hr |

The seals were peelable when assessed by both the standard test method and by manual evaluation.

EXAMPLE 10

The procedure of Example 1 was repeated save that the outer, tertiary layers of the film comprised a low density polyethylene (VESTOLEN A3515).

The film (50 microns; primary layer 1.5 microns thick) had a seal strength (140° C.; 20 psi; 0.5 sec) of 900 g/25 mm.

EXAMPLES 11 TO 14

The procedure of Example 1 was repeated save that the primary core layer respectively contained a calcium carbonate filler (particle size from 1 to 10 microns), or a titanium dioxide pigment as specified in the accompanying Table.

TABLE 3

| Property Additive | Test Information | Units | Ex 11 CaCO$_3$ | Ex 12 | Ex 13 TiO$_2$ | Ex 14 |
|---|---|---|---|---|---|---|
| | | Wt % on core | 20 | 15 | 10 | 10 |
| Thickness | | Micron | 85 | 80 | 60 | 80 |
| Density | ASTM D1505 | g/cm$^3$ | 0.72 | 1.05 | 1.0 | 1.0 |
| Opacity | BS 2923 (1958) | % | 75 | 91 | 79 | 80 |
| Gloss | ASTM D2457 | % | 47 | | ←75–85→ | |
| Modulus | ASTM D882 MD | MN/m$^2$ | 1206 | | 2187 | |
| | TD | | 869 | | 1730 | |
| Permeability: | | | | | | |
| Oxygen | 25° C., 0% RH | cm$^3$/m$^2$/24 hr | 1000 | | 780 | |
| Water vapour | 23° C., 85% RH | g/m$^2$/24 hr | 0.8 | | 0.6 | |
| Seal Strength | ICI test at 130° C. (1 Kgf/cm$^2$ for 2 secs) | g/25 mm | 350–400 | | >500 | |

I claim:

1. A multiple-layer polyolefin film comprising a primary layer of an adhesive resin and, on each surface thereof, a secondary layer of an olefin polymer wherein
    (a) the adhesive resin comprises an ethylene copolymer having a softening temperature below that of the secondary olefin polymer,
    (b) the secondary layer comprises a biaxially oriented layer of a propylene polymer, and
    (c) the thickness of the primary layer is less than 10% of the total film thickness.
2. A film according to claim 1 wherein the thickness of the primary layer is less than 5% of the total film thickness.

3. A film according to either of claims 1 and 2 wherein a substantial proportion of the adhesive ethylene copolymer melts at a temperature below 110° C.

4. A film according to any one of the preceding claims wherein the adhesive primary layer comprises an ethylene-vinyl acetate copolymer containing from 5 to 35% by weight of vinyl acetate.

5. A film according to claim 4 wherein the vinyl acetate content of the primary copolymer is from 20 to 28% by weight.

6. A film according to any one of the preceding claims wherein each secondary layer comprises a propylene homopolymer or a propylene-ethylene block copolymer.

7. A film according to any one of the preceding claims wherein a tertiary layer is present on one, or each, secondary layer.

8. A film according to any one of the preceding claims wherein the tertiary layer comprises a propylene-ethylene random copolymer.

9. A method of producing a multiple-layer polyolefin film comprising forming a first secondary film layer of an olefin polymer having on a surface thereof a primary layer of an adhesive resin, and bonding the primary layer to a surface of a second, secondary film layer of an olefin polymer wherein
  (a) the adhesive resin comprises an ethylene copolymer having a softening temperature below that of the secondary olefin polymer,
  (b) each secondary layer comprises an oriented layer of a propylene polymer, and
  (c) the thickness of the primary layer is less than 10% of the total film thickness.

10. A method according to claim 9 comprising coextruding the components of at least the primary and secondary layers in the form of a composite tube having the primary component on the internal surface thereof, quenching and orienting the tube, and collapsing the oriented tube to lay-flat form while the primary component is in a thermally softened state.

11. A multiple-layer polyolefin film comprising a primary layer of an adhesive resin and, on each surface thereof, a secondary layer of an olefin polymer wherein
  (a) the adhesive resin comprises an ethylene copolymer having a softening temperature below that of the secondary olefin polymer,
  (b) the secondary layer comprises a biaxially oriented layer of a propylene polymer, and
  (c) the thickness of the primary layer is less than 6% of the total film thickness.

* * * * *